April 10, 1928.  1,665,831
D. L. WILLIAMS
BREAKER APPLYING DEVICE
Filed Aug. 8, 1925   2 Sheets-Sheet 2
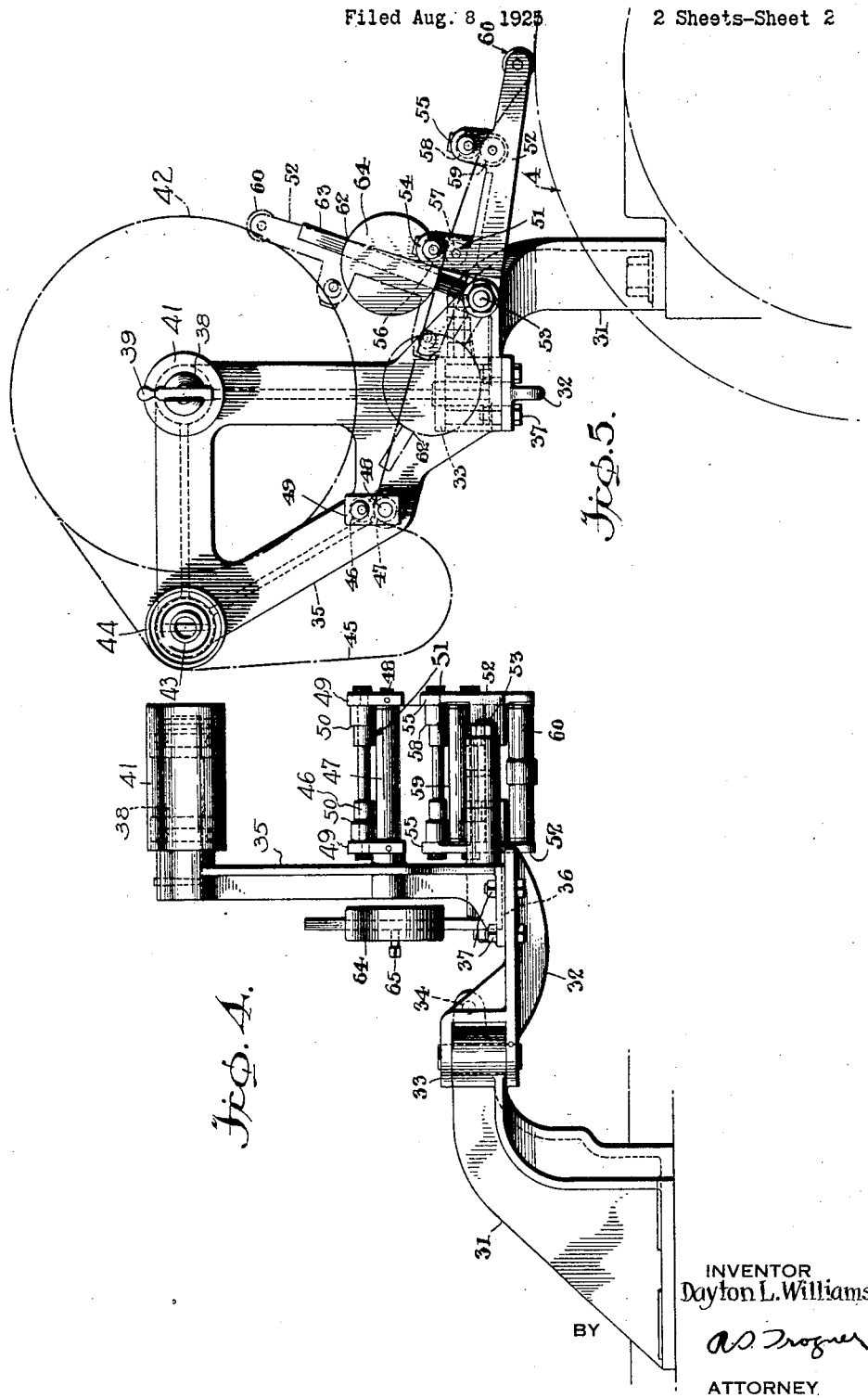
INVENTOR
Dayton L. Williams,
BY
ATTORNEY Patented Apr. 10, 1928.

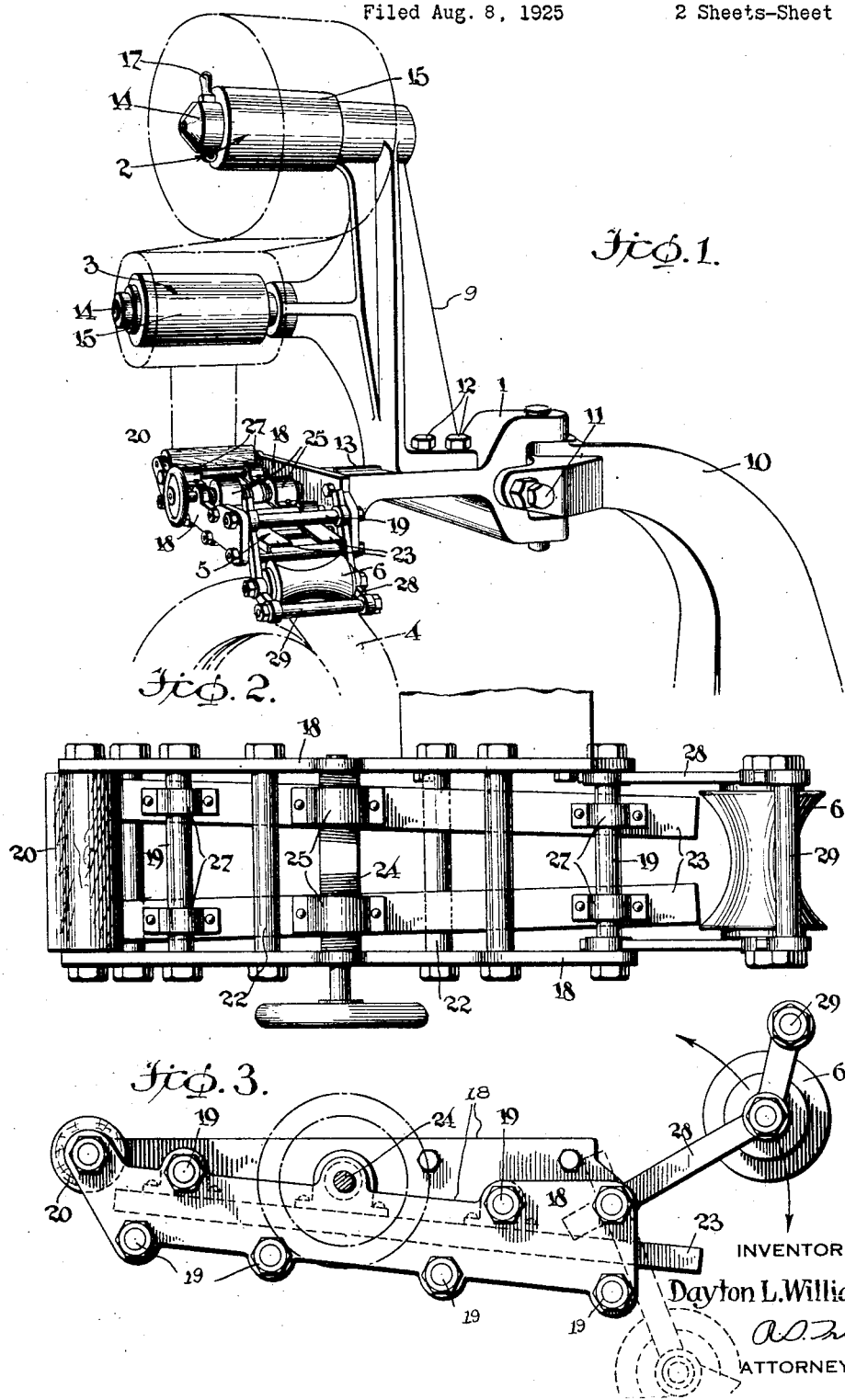

1,665,831

UNITED STATES PATENT OFFICE.

DAYTON L. WILLIAMS, OF AKRON, OHIO, ASSIGNOR TO THE GOODYEAR TIRE & RUBBER COMPANY, OF AKRON, OHIO, A CORPORATION OF OHIO.

BREAKER-APPLYING DEVICE.

Application filed August 8, 1925. Serial No. 49,126.

My invention relates to pneumatic tire building machines and it is particularly related to an improvement in a method of applying a breaker strip to the periphery of a tire carcass.

The object of this invention is to provide a convenient and exact method and machine for rapidly applying a breaker strip to a fabric or cord carcass.

In order to reduce the friction and shock to which the fabric structure is subjected, it is common to incorporate a heavy strip of rubberized fabric, commonly known as a breaker strip, between the several plies which constitute the carcass and the tread portion of a tire. The strip is usually of a coarse open mesh structure and is saturated or impregnated with a tacky rubber composition. The edges of the strip extend only a short distance beyond the shoulder portion of the tire and do not provide any reinforcing effect, their sole object being to reduce flexure and shock.

In the past the strip has been applied manually, but according to this invention the breaker strip is removed from the lined supply rolls, passed through a suitable guide device and subsequently stitched in position on the tire carcass. By my method I have reduced both time and manual labor necessary to the operation.

In the accompanying drawings:

Fig. 1 is a perspective of a device constructed in accordance with the principles of my invention;

Fig. 2 is a plan view of the guide and stitcher roll;

Fig. 3 is a side elevation of the device shown in Fig. 2;

Fig. 4 is a front elevation of a machine embodying a modification of the present invention; and Fig. 5 is a side elevation of the machine illustrated in Fig. 4.

Essentially, the device consists of a frame 1 pivoted in a convenient manner in order to swing into operative relation with respect to a tire core. A support 2 for rolls of lined breaker fabric is rotatably mounted on the frame together with an additional support 3 for rewinding the liner. The strip is brought in exact alignment with a core 4 by a guide device 5 before a pressure roll 6 stitches it to the tire carcass.

Referring to Figs. 1, 2 and 3, the frame is pivoted from an arm 10 which has an adjustable set screw 11 that engages the frame when the device is being employed. The arm may have an independent base or may constitute a part of a tire building machine. The upright portion 9 of the frame is held erect by means of bolts 12, but is adapted to be adjusted along a tongue and groove guide 13. Two extended shafts 14, which form parts of the breaker support 2 and the liner take up support 3, have rotatable sleeves 15 mounted thereon. The upper shaft has a latch 17 which maintains the upper sleeve 15 in its proper position upon the shaft. The rolls of breaker are supported preferably on the upper shaft, and the liner is rewound on the lower one.

Below the roll supports, and rigid with the frame member, is a guide device 5 supporting a stitcher roll 6. This device comprises two oppositely disposed side plates 18, held in position by a plurality of spacing pins 19. A wooden roll 20 and four metallic rollers 22, comprising sleeves mounted upon the pins 19, are supported between the plates 18. Adjustable angle irons 23 are secured upon the sleeves by means of collars 27 and serve as lateral guides for the fabric. The angle irons may be moved inwardly or outwardly with respect to each other by rotating a threaded shaft 24 that meshes with collars 25 which are rigidly secured to the angle irons. This adjustment provides for the accommodation of various widths of fabric.

The stitcher roll 6 is mounted at the exit end of the elongate guide member between two angular members 28 that are pivoted upon the end spacing pin 19. At the free end of these members is a handle 29 which may be employed in applying pressure to the roll during the stitching operation.

To facilitate the replacement of the rolls after all the breaker strip has been utilized and the liner rewound, I wind the lined fabric directly on the interchangeable sleeves 15. In this way, the rolls are given sufficient body to maintain their shape and at the same time they may be readily mounted in position on the shaft 14. The roll is replaced by releasing the latch 17, removing the bare sleeve 15 from the shaft 14, substituting a new roll and subsequently returning the latch to its former position. The roll of rewound fabric together with the collar, may be removed from the lower support 14, after which the bare sleeve, which previously constituted a part of the supply roller, may be fitted thereon to receive the liner as it unwinds. As illustrated in Fig. 1, the breaker strip and liner are unwound as a unitary band and conducted around the lower roller where the liner is rewound. The breaker strip continues beneath the roller 20 and passes over the rollers 22 to the exit end of the passageway formed by the angle irons 23 and the rollers 22.

When a strip is to be applied, the device is swung into operative position with respect to the core 4, as illustrated in Fig. 1. A small portion of the breaker strip is then attached to the fabric carcass and the core is rotated. At the same time, the stitcher roller 6 is brought into engagement with the core and sufficient pressure applied to exclude any air bubbles which are likely to be included by the rather non-uniform surface of the open meshed fabric. After the core has made one complete revolution, the strip is cut off and the end portions are joined. The device is subsequently swung out of operative position and the tire builder is then ready to apply the tread portion and so complete the building operation.

It will be noted that the guide members, which control the lateral movement of the breaker strip, are adapted for relative movement in order that they may accommodate any width of fabric. It will be appreciated, of course, that the invention is subject to many variations. For example, instead of pivoting the device out of engagement with the core, the guide and stitcher member may be mounted upon rolls and thereby brought into the desired relation with the core by a linear movement.

Where the breaker strip is a uniform rubberized fabric, the device, described above, is well adapted to apply the same to a tire carcass. However, when the edges of the breaker have a thin plastic strip of unvulcanized rubber attached thereto, some difficulty may be experienced in avoiding distortion thereof. I have, therefore, provided another form of the invention in order to care for this contingency. Referring to Figs. 4 and 5, the device illustrated thereby is provided with a supporting bracket 31 similar to the supporting bracket 10 in the construction previously described. A horizontally swingable arm 32 is secured to the bracket, by a hinge connection indicated at 33. A stop in the form of an adjustable set screw 34, is provided upon the bracket 31, and serves to limit the swinging motion of the arm 32, thereby to position it in proper alignment with respect to the plane of the tire core 4.

A triangular roll supporting bracket 35 is so secured to the swinging arm 32 by means of tongue and groove guides 36, that it may be adjusted longitudinally upon the arm 32, to position it correctly with respect to the center line of the tire core. The bracket is held in proper position upon the guides by means of the bolts 37. The upper end of the bracket is provided with a roll supporting shaft 38, which is slotted at its projecting end to receive a latch 39, that serves to retain a sleeve 41 of the roll 42 of breaker material upon the shaft.

The rearwardly projecting portion of the upright bracket is provided with a second shaft 43, which rotatably supports a sleeve 44 similar to the sleeve 41, which serves to receive the liner fabric as it is disengaged from the breaker strip 45. Suitable guide rollers 46 and 47 for the breaker are positioned below the shafts 38 and 43. A shaft 48 secured to the bracket 35 rotatably supports the roller 47, and the roller 46 is journalled in brackets 49 rigidly secured to the shaft 48. Also the roller 46 has shoulder portions 50 upon its ends, and engages the second roller 47 which is cylindrical in form.

In this form of the invention a guide mechanism 51 is adapted to swing upwardly toward the breaker roller 38. This mechanism includes side members 52 which are pivoted upon a shaft 53 secured to the arm 32 and are provided with upstanding lugs 54 and 55, having journals for rollers 56, 57, 58 and 59, respectively. A stitcher roller 60 is mounted in journals at the outer ends of the side members 52 in such position as to be adapted to stitch the breaker strip 45 to a tire carcass on the core 4 as the strip is delivered from the guide rolls 58 and 59.

I have provided a suitable mechanism 62 for holding the guide mechanism 51 in an elevated position, and also for applying pressure to the stitcher roller 60 when it is in operation. This mechanism includes a lever 63 rigidly secured to the shaft 53 that pivotally supports the sides 52 of the guide mechanism. The lever is provided with a counterweight 64 which may be adjusted upon the arm 58 by means of a set screw 65, in order to insure the proper balance between the counterweight and the guide mechanism. It will be apparent that when the stitcher mechanism is lowered to operative position the counterweight will have moved to the right, past its dead center and will exert a downward force which is transmitted to the stitcher roll 60 and thus causes it to press steadily against the breaker strip. However, when the stitcher mechanism has been swung upwardly to inoperative position, indicated by dot-and-dash lines of Fig. 5, the counterweight will have moved to the other side of its dead center, and will serve to maintain the stitcher mechanism in such inoperative position. The shape and design of the stitcher rollers 6 and 60 is optional. I have found that the roller 60 illustrated in Fig. 4 to be particularly adapted for drum or flat-built tire construction, whereas the roller 6 having a concave surface has been found to be more applicable in core construction.

In operating the device shown by Figs. 4 and 5, the roll of lined fabric 42 is mounted upon the shaft 38. The strip is unwound by bringing it around the liner roller 44 which, at the same time, removes the liner. The breaker is then passed between the several sets of rolls and finally beneath the stitcher 60, when the operator is ready to apply it to the carcass. The frame is swung into engagement with the set screw 34 and the guide mechanism 51 is pivoted toward the score 4 until the stitcher roller 60 rests thereon. The adhesive tendency of the strip when applied to the rotatable carcass is sufficient to unwind the breaker and remove the liner therefrom. After one complete turn, the exact length of breaker is cut off and the ends thereof are joined in the same manner as before described.

While I have disclosed but the preferred forms of my invention and have described, those forms in detail, it will be apparent to those skilled in the art that the invention may be subjected to other variations without departing from the principles herein set forth and I desire, therefore, that the invention shall be construed only in accordance with prior art and the appended claims.

What I claim is:

1. A tire building machine comprising a rotatable core, a horizontally movable support positioned adjacent the core, a breaker supply roller secured horizontally upon the support, a liner rewind roller mounted upon the support in parallel relation with respect to the breaker supply roller, a guide mechanism pivoted to the support to swing vertically in the plane of the rollers, and a horizontal stitcher roller secured to the front end of the guide and adapted to press the tire fabric into contact with the core as it leaves the guide mechanism.

2. A tire making machine comprising a rotatable core, a horizontally swingable support pivoted adjacent one side of the core, a stop adapted to arrest the swinging movement of the support when it has reached a position parallel to the axis of the core, a breaker strip supply roll and a liner rewind roll secured to the swingable support and adapted to be swung into the plane of the rotatable core, a guide mechanism pivoted to the support and adapted to swing into the plane of the supply roller and the rewind roller and a stitcher roller journalled upon the free end of the guide mechanism in position to stitch the breaker fabric to the tire as it is delivered from the guide mechanism.

3. A tire building machine comprising a rotatable core, a supporting arm pivoted adjacent one side of the core and adapted to swing into parallel relation with respect to the axis of the core, a breaker strip supply roller and a liner rewind roller secured to the arm with their axes in parallel relation with respect to the axis of the core, a guide mechanism secured to the arm, said mechanism comprising side members pivoted to the support and adapted to swing vertically in the plane of the core, guide rollers horizontally positioned between the side members, the guide rollers being arranged in pairs and one of them having shouldered portions at its ends whereby to maintain the edges of the breaker fabric in smooth unwrinkled condition, and a stitcher roller journalled at the ends of the side members in position to stitch the breaker fabric to the core as it is unwound from the guide rollers.

4. A tire fabricating machine comprising a rotatable core, a supporting arm pivoted adjacent one side of the core and adapted to swing into parallel relation with respect to the axis of the core, a stop positioned to arrest the swinging arm when it has been correctly positioned, a guide upon the swinging arm, a vertical arm slidably secured upon the swinging arm, a breaker fabric supply roll and a rewind roll secured upon the vertical arm and adapted to be swung into the plane of the core.

5. A tire building machine comprising a rotatable core, a breaker strip applying mechanism mounted adjacent the core, said mechanism comprising a support, a guide mounted upon the support and pivoted to swing upwardly in the plane of the core, and a counter weight attached to the guide to hold it in either raised or lowered position.

6. A tire building machine comprising a rotatable core, a breaker strip applying mechanism mounted adjacent the core, said mechanism comprising a supporting guide mounted on the support and pivoted to swing upwardly in the plane of the core, an arm rigidly secured to the guide, a counter weight attached to the arm, and adapted to hold the guide in raised position when it is swung upwardly past its dead center or to cause the guide to exert a downward pressure when it is swung downwardly past the dead center.

In witness whereof, I have hereunto signed my name.

DAYTON L. WILLIAMS